(12) United States Patent
Li

(10) Patent No.: US 8,982,081 B2
(45) Date of Patent: Mar. 17, 2015

(54) DISPLACEMENT SENSING TOUCH PANEL AND TOUCH SCREEN USING THE SAME

(75) Inventor: Hao Li, Chandler, AZ (US)

(73) Assignee: Shenzhen New Degree Technology Co., Ltd., Shenzhen (CN)

( * ) Notice: Subject to any disclaimer, the term of this patent is extended or adjusted under 35 U.S.C. 154(b) by 114 days.

(21) Appl. No.: 13/822,461

(22) PCT Filed: Sep. 9, 2011

(86) PCT No.: PCT/CN2011/079509
§ 371 (c)(1),
(2), (4) Date: Mar. 12, 2013

(87) PCT Pub. No.: WO2012/031564
PCT Pub. Date: Mar. 15, 2012

(65) Prior Publication Data
US 2013/0181928 A1    Jul. 18, 2013

Related U.S. Application Data

(60) Provisional application No. 61/382,006, filed on Sep. 12, 2010.

(51) Int. Cl.
*G06F 3/041* (2006.01)
*G06F 3/044* (2006.01)
*G06F 3/045* (2006.01)

(52) U.S. Cl.
CPC ............... *G06F 3/041* (2013.01); *G06F 3/0414* (2013.01); *G06F 3/044* (2013.01); *G06F 3/045* (2013.01); *G06F 2203/04106* (2013.01)

USPC ............................. 345/173; 345/1.1; 345/30

(58) Field of Classification Search
None
See application file for complete search history.

(56) References Cited

U.S. PATENT DOCUMENTS 7,492,583 B2 * 2/2009 Lv ................................. 345/173
2011/0216064 A1 * 9/2011 Dahl et al. .................... 345/428

FOREIGN PATENT DOCUMENTS

CN    101739170    6/2010
CN    101794036    8/2010

\* cited by examiner

*Primary Examiner* — Muhammad N Edun
(74) *Attorney, Agent, or Firm* — Hamre, Schumann, Mueller & Larson, P.C.

(57) ABSTRACT

The disclosure relates to a displacement sensing touch panel and a touch screen using the touch panel. The touch panel includes a first panel, a second panel, and a displacement sensor sandwiched between the first panel and the second panel. The displacement sensor deforms when a pressure is applied to the first panel. The touch screen includes the touch panel, a controller where the touch positions and forces applied are deduced from the readings of the displacement sensor, and a display coupled to the controller and adjacent to the touch panel. Displacement information is collected through the displacement sensor to deduce the positions and magnitudes of the forces applied to the first panel of the touch panel or touch screen.

18 Claims, 3 Drawing Sheets

DISPLACEMENT SENSING TOUCH PANEL AND TOUCH SCREEN USING THE SAME

TECHNICAL FIELD

The present invention relates to a touch panel and, more particularly, to a touch panel configured to detect contact forces applied thereto and a touch screen using the touch panel.

BACKGROUND ART

A touch panel offers intuitive inputting for a computer or other data processing devices. It is especially useful in mobile devices where other input devices, such as keyboards and mice, are not easily available.

There are many different types of touch sensing technologies, including capacitive, resistive, infrared and surface acoustic wave. All of them only sense the position of touches on a panel, but cannot sense the force applied to the touch panel.

What is needed, therefore, is a touch panel which not only senses the position of the touch, but also senses the force applied thereto, and a touch screen using the touch panel.

DISCLOSURE OF INVENTION

Technical Problem

The present invention provides a touch panel and a touch screen using the touch panel. The touch panel overcomes the limitations which many different types of touch sensing technologies including capacitive, resistive, infrared and surface acoustic wave only sense the position of touches on a panel but cannot sense the force applied to the touch panel.

Technical Solution

A touch panel includes a first panel, a second panel, and at least one displacement sensor sandwiched between the first panel and the second panel. The at least one displacement sensor deforms when a pressure is applied to the first panel. A touch screen includes a touch panel. The touch panel includes a first panel, a second panel, and at least one displacement sensor sandwiched between the first panel and the second panel. The at least one displacement sensor deforms when a pressure is applied to the first panel. The touch screen further includes a controller where the touch positions and forces applied are deduced from the headings of the at least one displacement sensor, and a display coupled to the controller and adjacent to the touch panel.

Advantageous Effects

The touch panel and the touch screen each can not only sense the position of the touch, but also sense the force applied thereto.

DESCRIPTION OF DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

MODE FOR INVENTION

Figure 1:
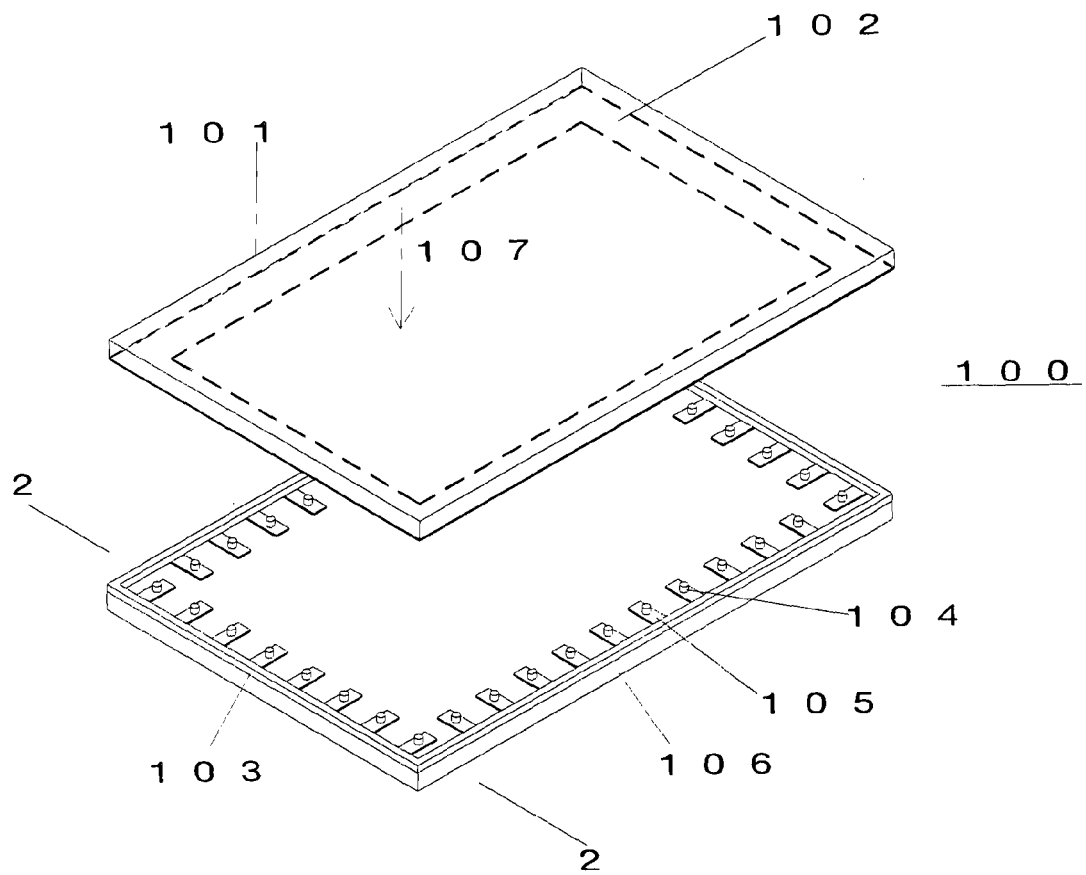
FIG. 1 is an exploded perspective view of a touch panel in accordance with a first embodiment of the disclosure.

Referring to FIG. 1, a touch panel 100 in accordance with a first embodiment of the disclosure is illustrated. The touch panel 100 includes a first panel 101, a second panel 106 located below the first panel 101, a frame 103 located between the first panel 101 and the second panel 106, a first electrode 102 disposed onto the bottom surface of the first panel 101, a plurality of second electrodes 105 disposed onto the top surface of the second panel 106, and a plurality of displacement sensors 104. Each of the displacement sensors 104 is disposed on top of one of the second electrodes 105. The second electrodes 105 are placed on the peripherals of the second panel 106. The first electrode 102 is disposed on the peripherals of the first panel 101 and forms an opening. The size of the opening formed by first electrode 102 is determined by the distance between the displacement sensor 104 and the edge of the bottom panel 106.

The first panel 101 can be transparent. The first panel 101 can be made from plates of glass or polymer. The first panel 101 and the second panel 106 are bonded together by the frame 103. The frame 103 supports a predetermined gap between the first panel 101 and the second panel 106. The frame 103 is placed on the peripherals of the second panel 106. The frame 103 encloses the entire peripherals of the touch panel 100. The displacement sensors 104 are placed on the peripherals of the second panel 106. The displacement sensors 104 are spaced from the frame 103 and closer to the central part of the second panel 106 with respect to the frame 103. Each displacement sensor 104 is physically connected and electrically coupled to the first electrode 102 and a corresponding one of the second electrodes 105. Each displacement sensor 104 is located in the predetermined gap between the first panel 101 and the second panel 106. The electrodes 102, 105 are electrically connected to a touch panel controller through flexible connectors. When a touch with force 107 is applied to the first panel 101, the first panel 101 deflects and transforms the deflection to the displacement sensors 104. Once the force 107 is released, the first panel 101 substantially returns to its original configuration.

Figure 2:
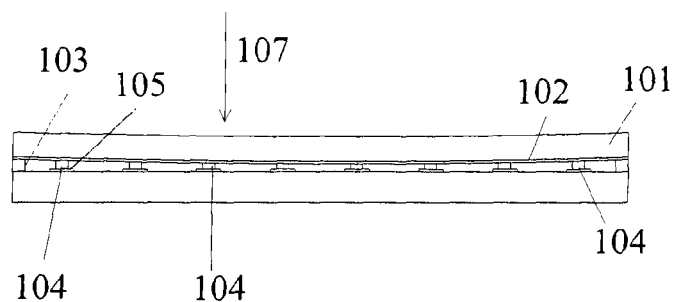
FIG. 2 is a cross sectional view of the touch panel taken along lines 2-2 of FIG. 1.

Referring also to FIG. 2, under the applied force 107, the first panel 101 deflects slightly. The amount of deflection depends on the physical dimensions of the touch panel 100, the Young's modulus of the glass, and the size and Young's modulus of sensor material. However, for a predefined touch panel construction, the deflection of the first panel 101 will only depends the magnitude and position of the force 107 applied to the surface of the first panel 101. In addition, each displacement sensor 104 will detect the magnitude of the deflection according to the relative position of the displacement sensors 104 on the second panel 106. For example, the deflection of the displacement sensor 104 farther from the force 107 is smaller than that of the displacement sensor 104 near to the force 107 due to the application of force 107. When the force 107 is applied to the first panel 101, the first panel 101 deflects towards the bottom panel 106 to form a concave shape. Typically, in the cross section taken along lines 2-2, the magnitude of displacements detected by the displacement sensors 104 forms a bell shaped curve with respect to the position of the displacement sensors 104. The shape and magnitude of the curve can be correlated to the position and the magnitude of the force 107 applied to a top surface of the first panel 101. Numerical calculations, computer simulations, and experimental look up table can be constructed to deduce from the sensor values to get the touch position and magnitude of the force 107. In this case, only forces perpendicular to the top surface of the first panel 101 are considered, forces from other directions will have minimal impact because the first panel 101 is fixed by the frame 103. All readings from the displacement sensors 104 are collected and results analyzed to determine the position and magnitude of the touch applied to the first panel 101.

The number and position of the displacement sensors 104 can vary according to different design of the touch panel 100. Fewer or more displacement sensors 104 may be used and the distribution of the displacement sensors 104 may not need to be uniform. For example, more displacement sensors 104 can be used in one side of the touch than the adjacent side.

Two or more touch positions may also be detected through the readings of the displacement sensors 104. A relationship of touch positions and magnitude can be correlated through numerical calculations, computer simulations and experimental methods. In this fashion multitouch operations may be detected.

All displacement sensors 104 are scanned at a predetermined rate, for example, 60 Hz. The touch position and force value are deduced for each frame. In this fashion, the movement of a touch can be determined, and touch gestures can be determined through predefined algorithms. For example, when the touch position moves with time from right to left, a flip action is implied. In addition, force information can be used to further define a touch action, for example, a faster flipping action may be performed when higher force is detected.

Figure 3:
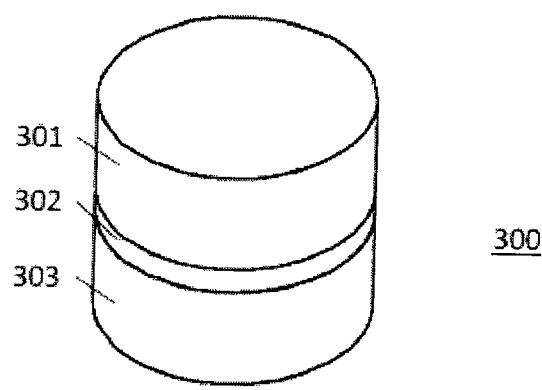
FIG. 3 shows a capacitive displacement sensor used in the touch panel of FIG. 1.
Figure 4:
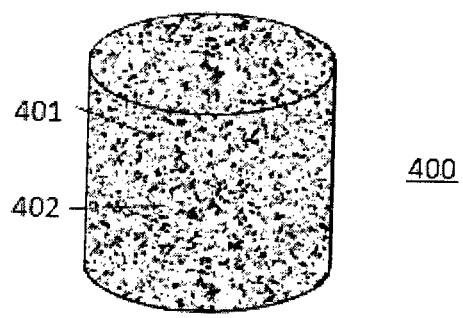
FIG. 4 shows a conductive composite displacement sensor used in the touch panel of FIG. 1

The displacement sensors 104 may be any type of displacement sensor. Referring also to FIG. 3, the displacement sensor 104 may be a capacitive pressure sensor 300. The capacitive pressure sensor 300 includes a first conductor 301, a second conductor 303, and a sandwich structure with a thin flexible insulating layer 302 placed between the first conductor 302 and the second conductor 303. The displacement is measured by the change of capacitance caused by variation of the thickness of the insulating layer. The capacitance measurements are carried through the first and second electrodes 102 and 105. The displacement can be deduced through the measured capacitance changes. Referring also to FIG. 4, the displacement sensor 104 may be a composite conductor 400. The composite conductor 400 consists of small conducting particles 401 dispersed in an insulating polymer matrix 402. The conducting particles 401 may have sizes ranging from 10 nm to 10 um. Near the percolation conduction threshold, small changes in the vertical dimension lead to significant resistance changes. By measuring the resistance through the first and second electrodes 102 and 105, the displacement can be deduced. Other displacement sensors, such as optical sensors and strain gauges may also be used.

Figure 5:
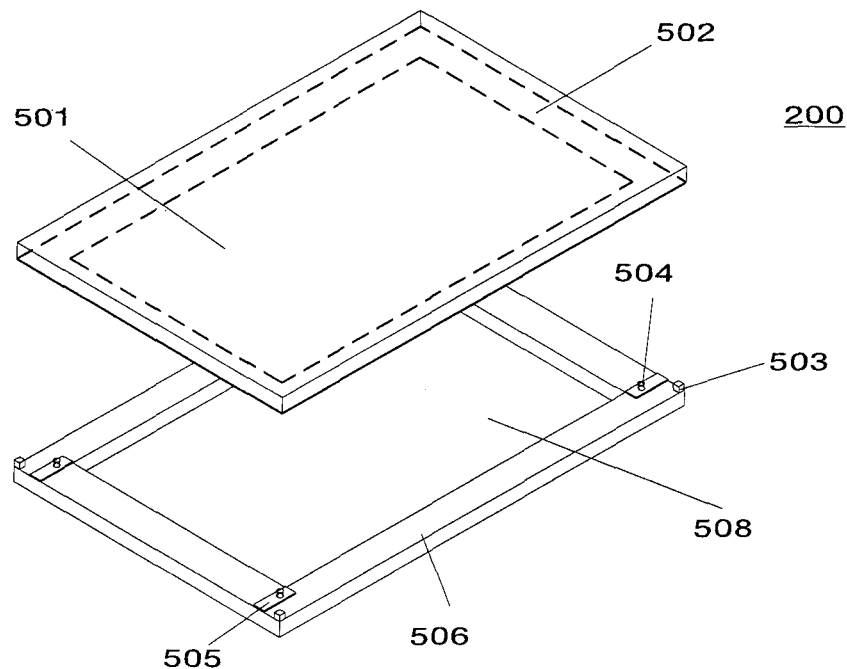
FIG. 5 is an exploded perspective view of a touch panel in accordance with a second embodiment of the disclosure.

Referring to FIG. 5, a touch panel 200 in accordance with a second embodiment of the disclosure is illustrated. The touch panel 200 of the second embodiment is similar to the touch panel 100 of the first embodiment, the differences are that four frames 503 are located at four corners of the second panel 506 to support the gap between the first panel 501 and the second panel 506 instead of the frame 103, four second electrodes 505 are located at the four corners of the second panel 506, and four displacement sensors 504 physically and electrically connected to the second electrodes 505 and a first electrode 502. In other embodiments, other configurations of frame placement may be adopted so long as they define the gap between the first panel 501 and the second panel 506. The frames 503 also prevent a relative lateral movement of the first and second panels 501, 506. The second panel 506 may have a center opening 508. The center opening 508 may be used to house a display (not shown) coupled to the touch panel 200. In this fashion, an improved touch panel transmission is achieved. In addition, the second panel 506 is not limited to transparent materials and may be of any type of transparent or opaque material. The second panel 506 may be formed by the housing of the device where the touch panel 200 is used.

The displacement sensors 504 are placed in the corners of the second panel 506. The first electrode 502 and the second electrodes 505 are physically and electrically connected to the displacement sensors 504. The touch position and magnitude of the force can be deduced by the magnitude and ratios of the displacements detected. Numerical calculations, computer simulations, and experimental look up table can be constructed to establish the relationship.

The first panels 101, 501 may also be a display, such as an OLED display or LCD display. The first panels 101, 501 may also be a touch panel, such as a resistive, capacitive and surface acoustic touch panels; the touch panel may provide position information and the displacement sensors 104, 504 provide the force information. It also should be noted that the first and second electrodes are interchangeable. For example, the first electrode may be deposited on the second panel and vise versa.

Figure 6:
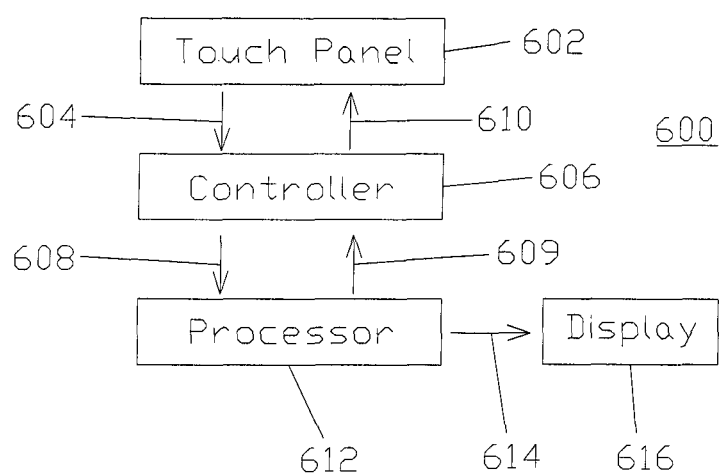
FIG. 6 is a block diagram of a touch screen using the touch panel of the present disclosure.

While the force sensing device described herein may be used in electronic devices in general, a block diagram of a force sensing touch screen system 600 as an example is depicted in FIG. 6. The touch screen 600 includes a touch panel 602, a touch screen controller 606, a processor 612 and a display 616. The touch panel 602 may be the touch panel 100 of the first embodiment or the touch panel 200 of the second embodiment or any other related embodiments. The touch screen controller 606 provides drive signals 610 to the touch panel 602, and a sense signal 604 is provided from the touch panel 602 to the touch screen controller 606, which periodically provides a controller signal 608 of the touch position and force to the processor 612. The processor 612 interprets the controller signal 608, determines a function in response thereto, and provides a display signal 614 to the display 616.

Less number of displacement sensors 104, 504 may be used in situations where the touch positions are known and/or only force information is needed. For example, as few as one displacement sensor 104, 504 may be used to couple with a touch screen or a touch panel through which position information is obtained. In another embodiment, a force sensing button can be devised through the present invention, where force information is obtained through one or more displacement sensor. This force information may be used to provide a force triggered response, such as a continuous adjustment button, or an on/off function.

Finally, the above-discussion is intended to be merely illustrative of the disclosure and should not be construed as limiting the appended claims to any particular embodiment or group of embodiments. Thus, while the disclosure has been described with reference to exemplary embodiments, it should also be appreciated that numerous modifications and alternative embodiments may be devised by those having ordinary skill in the art without departing from the broader and intended spirit and scope of the disclosure as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

What is claimed is:

1. A touch panel comprising:
   a first panel;
   a second panel;
   at least one displacement sensor sandwiched between the first panel and the second panel, the at least one displacement sensor deforming when a pressure is applied to the first panel; and
   a first electrode attached to a bottom surface of the first panel and at least one second electrode attached to a top surface of the second panel, and the at least one displacement sensor is physically connected and electrically coupled to the first electrode and the at least one second electrode.

2. The touch panel as claimed in claim 1 further comprising a frame separating the first panel and the second panel to support a gap between the first panel and the second panel.

3. The touch panel as claimed in claim 2, wherein the at least one displacement sensor is located in the gap between the first panel and the second panel.

4. The touch panel as claimed in claim 2, wherein the frame is placed on peripherals of the second panel and encloses the entire peripherals of the second panel.

5. The touch panel as claimed in claim 1, wherein the first electrode is placed on peripherals of the first panel and disposed on the entire peripherals of the first panel.

6. The touch panel as claimed in claim 1, wherein the touch panel comprises a plurality of the second electrodes and a plurality of the displacement sensors, each of the displacement sensors being disposed on top of one of the second electrodes, the second electrodes and the displacement sensors being placed on peripherals of the second panel, respectively.

7. The touch panel as claimed in claim 6, wherein the amount of the second electrodes is four, the amount of the displacement sensors being four, the second electrodes and the displacement sensors being located at four corners of the second panel.

8. The touch panel as claimed in claim 6, wherein the first and second electrodes are electrically connected to a touch panel controller through flexible connectors.

9. The touch panel as claimed in claim 1 further comprising a plurality of frames separating the first panel and the second panel to support a gap between the first panel and the second panel, the at least one displacement sensor is located in the gap between the first panel and the second panel.

10. The touch panel as claimed in claim 1, wherein the at least one displacement sensor is a capacitive pressure sensor measuring capacitance changes in accordance to displacement.

11. The touch panel as claimed in claim 1, wherein the at least one displacement sensor is a composite conductor consisting of an insulating matrix and conducting particles dispersed within.

12. The touch panel as claimed in claim 1, wherein the first panel is a display.

13. The touch panel as claimed in claim 1, wherein the first panel is a touch panel.

14. A touch screen comprising:
    a touch panel comprising a first panel, a second panel, and at least one displacement sensor sandwiched between the first panel and the second panel, the at least one displacement sensor deforming when a pressure is applied to the first panel;
    a controller where the touch positions and forces applied are deduced from the readings of the at least one displacement sensor;
    a display coupled to the controller and adjacent to the touch panel; and
    a first electrode attached to a bottom surface of the first panel and at least one second electrode attached to a top surface of the second panel, the at least one displacement sensor being physically connected and electrically coupled to the first electrode and the at least one second electrode.

15. The touch screen as claimed in claim 14, wherein the touch panel further comprises a frame separating the first panel and the second panel to support a gap between the first panel and the second panel, the at least one displacement sensor being located in the gap between the first panel and the second panel.

16. The touch screen as claimed in claim 14, wherein the second panel of the touch panel has an opening housing the display.

17. The touch screen as claimed in claim 14, wherein the first panel is a display.

18. The touch screen as claimed in claim 14, wherein the first panel is a touch panel.

* * * * *